(12) United States Patent
Ito

(10) Patent No.: US 6,302,795 B1
(45) Date of Patent: Oct. 16, 2001

(54) DATA PROCESSING SYSTEM, APPARATUS AND METHOD

(75) Inventor: Takeshi Ito, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/364,584

(22) Filed: Jul. 30, 1999

(30) Foreign Application Priority Data

Jul. 31, 1998 (JP) .................................................. 10-218295

(51) Int. Cl.[7] .............................................. A63F 9/24
(52) U.S. Cl. ................................ 463/29; 16/43; 16/44
(58) Field of Search ............................... 463/16, 29, 43, 463/44

(56) References Cited

U.S. PATENT DOCUMENTS

| | | | |
|---|---|---|---|
| 4,247,106 | * 1/1981 | Jeffers et al. | 273/85 G |
| 5,096,195 | * 3/1992 | Gimmon | 273/138 A |
| 5,162,989 | 11/1992 | Matsuda . | |
| 5,178,389 | * 1/1993 | Bentley et al. | 273/138 A |
| 5,257,179 | * 10/1993 | DeMar | 364/410 |
| 5,509,070 | * 4/1996 | Schull | 380/4 |
| 5,533,727 | * 7/1996 | DeMar | 463/23 |
| 5,577,735 | * 11/1996 | Reed et al. | 273/439 |
| 5,613,089 | * 3/1997 | Hornbuckle | 395/491 |
| 5,632,681 | * 5/1997 | Bakoglu et al. | 463/44 |
| 5,715,169 | * 2/1998 | Noguchi | 364/474.07 |
| 6,115,471 | * 9/2000 | Oki et al. | 380/242 |

FOREIGN PATENT DOCUMENTS

| | | |
|---|---|---|
| 0 671 711 | 9/1995 | (EP) . |
| 0 784 258 | 7/1997 | (EP) . |

* cited by examiner

Primary Examiner—Valencia Martin-Wallace
Assistant Examiner—Carmen D. White
(74) Attorney, Agent, or Firm—Helfgott & Karas, P.C.

(57) ABSTRACT

A portable terminal machine which controls the execution of a downloaded program depending on a usage time limit when a sub program downloaded from a video game machine is stored in the storage device, the time of communication with the video game machine obtained from the clock is recorded in the sub program as a time stamp. At the time of the startup of the sub program, the portable terminal machine calculates the usage time limit based on the time of communication and compares this usage time limit against the current time obtained from the clock and stops the startup of the sub program if the usage time limit has been exceeded.

25 Claims, 12 Drawing Sheets

STRUCTURAL BLOCK DIAGRAM OF THE VIDEO GAME MACHINE AND PORTABLE TERMINAL MACHINE

SERIES OF PROCESSING STEPS IN THE DATA PROCESSING SYSTEM

SERIES OF PROCESSING STEPS IN THE DATA PROCESSING SYSTEM

SCHEMATIC DIAGRAM OF THE FORMAT OF THE SUB PROGRAM

BLOCK DIAGRAM OF VIDEO GAME DEVICE

DATA PROCESSING SYSTEM, APPARATUS AND METHOD

BACKGROUND OF THE INVENTION

1. Field of the Invention

The present invention relates to a data processing system and method that utilizes a program downloaded from outside, along with a data processing apparatus and method, and particularly to a data processing system and method, along with a data processing apparatus and method suitable for application to a system utilizing a video game machine and a portable information communications terminal.

2. Description of the Prior Art

Many types of home TV game apparatus such as video game machines and personal computers or other such home consoles use programs that are downloaded from outside. Examples of these programs include programs distributed as shareware. Shareware is a type of software that differs from public domain software and freeware in that it is permitted to be used for a certain fixed period of time on a trial-use basis, and is then paid for when it is to be used in earnest. Shareware can be obtained inexpensively by means of the Internet or other communications means or by CD-ROM or other recording media. By using such shareware, the user can use only the software that she or he likes.

In passing, such shareware is preferably utilized by being obtained on CD-ROM or other recording media which is loaded into a video game machine or other home console, or otherwise utilized in a portable terminal machine after being downloaded from a video game machine. However, the programs conventionally distributed as shareware have a problem in that once they are downloaded, they can be used indefinitely.

In particular, when a program recorded on CD-ROM or other recording media is downloaded from a video game machine, it is difficult to manage this downloading from the video game machine side or from the recording media side, so there is a problem in that a program recorded on a single recording media may be illegally downloaded multiple times.

The present invention came about in light of the aforementioned problems at the time that conventional shareware is downloaded, and its object is to provide a data processing system and method, along with a data processing apparatus and method whereby, when a program read out by a main unit is downloaded to a sub unit, the time of downloading is recorded in the program, so that the execution of the program downloaded to the sub unit may be controlled.

SUMMARY OF THE INVENTION

In order to achieve the objects of the invention, the data processing system according to the present invention is a data processing system wherein a sub unit is removably connected via a connector to a main unit that performs data processing, the main unit has a program supply for supplying a program to the sub unit, and the sub unit has storage for storing the program supplied by the program supply and the time of communication with the main unit; a clock for marking time; a time comparitor for comparing a usage time limit, which is a time limit until the program is executable in the sub unit and which is obtained, based on the time of communication, against a time obtained from the clock; and an execution control that exerts control of the execution of the program based on the results of comparison performed by this time comparison means.

In the data processing system, the program provided by the main unit is downloaded to the sub unit, and the usage time limit obtained, based on the time when the download occurred, is compared against the current time obtained from the clock and the execution of the program downloaded to the sub unit is controlled depending on the results.

In addition, the data processing system has a program supplied from the main unit to the sub unit which is read by the main unit by a program reader from a recording medium removably loaded into the main unit; the main unit has a program comparator that compares the program stored in the sub unit storage against that which is read from the recording medium by the program reader; the sub unit has a time updating means for updating the usage time limit, and this time updating means updates the usage time limit of the stored program in depending on the results of comparison of the program comparator.

The data processing system according to the present invention compares the program which is read by the main unit from the recording medium against the stored program in the sub unit and updates the usage time limit of the stored program in the sub unit depending on whether or not the stored program of the sub unit is that which is read from the recording medium loaded in the main unit.

Moreover, the data processing system according to the present invention is characterized in that the sub unit has a wireless reception means that receives wireless signals from outside and absolutely accurate absolute time information. The current time obtained from the clock can be corrected based on the absolute time information.

The data processing system according to the present invention corrects the time obtained by the clock of the sub unit to the absolute time obtained by the wireless reception means.

The data processing method according to the present invention is a data processing method wherein a sub unit is removably connected to a main unit that performs data processing, wherein a program supplied from the main unit to the sub unit and the time of communication with the main unit are stored and a usage time limit, which is a time limit during which the program is executable in the sub unit and based on the time of communication, is compared against the current time; and control of the program is based on the results of this comparison.

The data processing method downloads a program supplied by the main unit to the sub unit, compares the current time against the usage time limit obtained based on the time when the download occurred, and controls the program downloaded to the sub unit depending on these results.

In addition, the program supplied from the main unit to the sub unit is one that the main unit had read from a recording medium removably loaded in the main unit, the program stored in the sub unit is compared against that read from the recording medium, and the usage time limit of the program stored in the sub unit is updated depending on the results of this comparison.

The data processing method compares the program read from the recording medium by the main unit against the program stored in the sub unit and updates the usage time limit of the program stored in the sub unit depending on whether or not the program stored in the sub unit is that read from the recording medium loaded in the main unit.

The data processing apparatus has storage means for storing a program supplied by data processing equipment and the time of communication with the data processing equipment; a clock for marking time; a time comparator for comparing a usage time limit, which is a time limit during which the program is executable in the sub unit and which is obtained based on the time of communication, against a time obtained from the clock and a control that controls the operation of the program based on the results of comparison performed by this time comparator.

The data processing apparatus downloads a program supplied by the data processing equipment, compares the current time obtained from the clock against the usage time limit obtained based on the time when the download occurred, and control of the operation of the downloaded program, depending on these results.

In addition, the program in the data processing apparatus is one read by the data processing equipment from a recording medium removably loaded into the data processing equipment; it has a time updater for updating the usage time limit, and this time updater updates the usage time limit of the program depending on the results of comparing the program against that read from the recording medium.

The data processing apparatus compares the program which is read by the data processing equipment from the recording medium against the stored program and updates the usage time limit of the stored program depending on whether or not the stored program is that which is read from the recording medium loaded in the data processing equipment.

Moreover, the data processing apparatus according to the present invention is characterized in that has a wireless receiver that receives wireless signals from outside. The wireless receiver receives absolutely accurate absolute time information, and the current time obtained from the clock can be corrected based on the absolute time information.

The data processing apparatus corrects the time obtained by the clock to the absolute time obtained by the wireless receiver.

The data processing method has a program supplied from data processing equipment and the time of communication with the data processing equipment is stored. A usage time limit, which is a time limit until the program is operable and which is obtained based on the time of communication, is compared against the current time; and control of the operation of the program is based on the results of this comparison.

The data processing method downloads a program supplied by the data processing equipment, compares the current time against the usage time limit obtained based on the time when the download occurred, and controls the operation of the downloaded program depending on these results.

In addition, the program of the data processing method is one that the data processing equipment had read from a recording medium removably loaded in the data processing equipment, the program is compared against that read from the recording medium, and the usage time limit of the program is updated depending on the results of this comparison.

The data processing method compares the program read from the recording medium by the data processing equipment against the stored program and updates the usage time limit of the stored program depending on whether or not the stored program is that read from the recording medium loaded in the data processing equipment.

DETAILED DESCRIPTION OF THE PREFERRED EMBODIMENT

Figure 1:
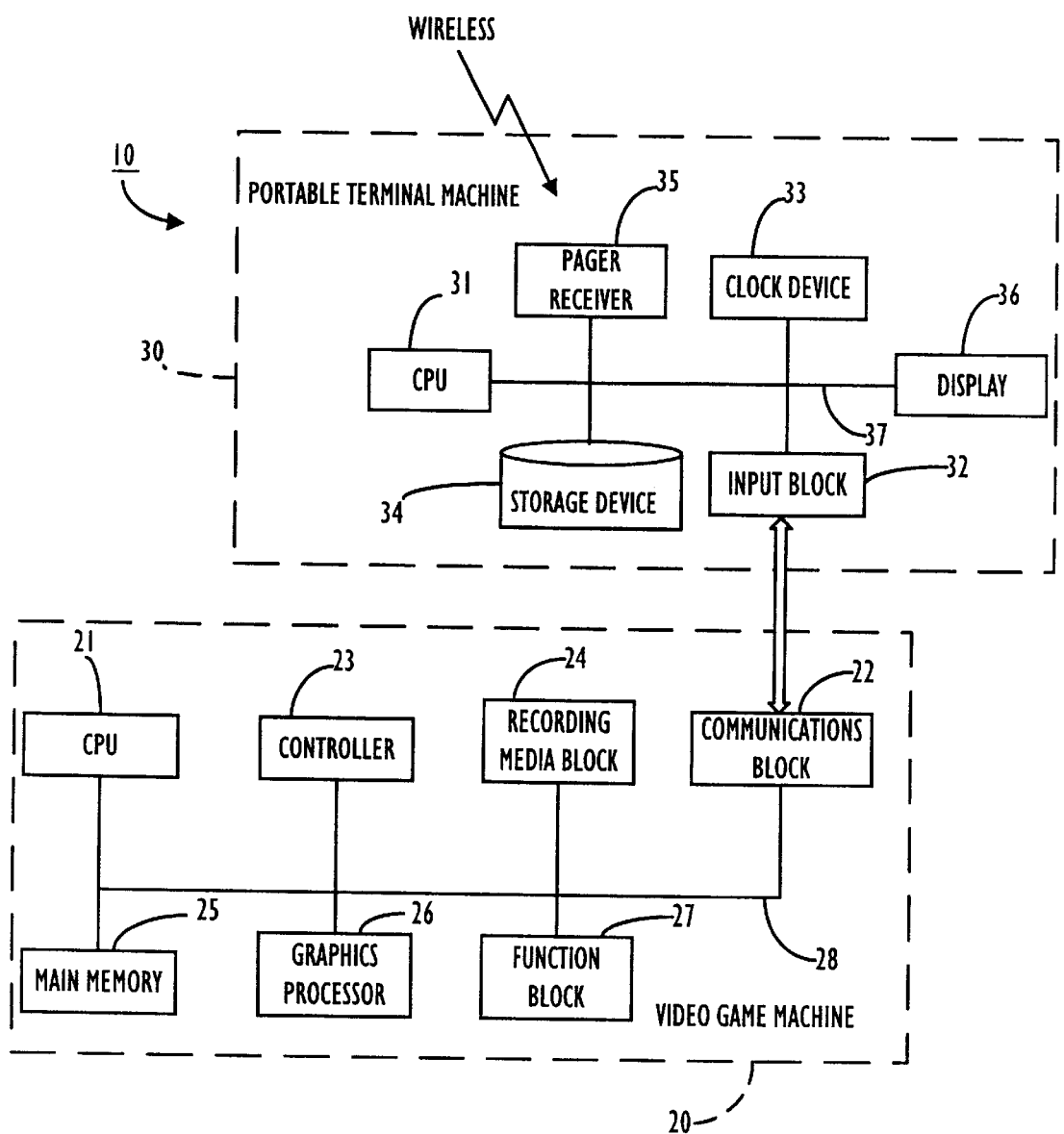
FIG. 1 is a block diagram showing the structure of a video game machine and portable terminal machine which constitute a data processing system which is a mode of working the present invention.

Shown in FIG. 1, is a data processing system 10 consisting of a video game machine 20 as a home console and a portable terminal machine 30 that downloads a program from this video game machine 20.

The data processing system 10 consists of the video game machine 20 which is the main unit that performs data processing and portable terminal machine 30 which is a sub unit of video game machine 20 which downloads a program from the video game machine 20 and runs the program. Portable terminal machine 30 is detachably connected electrically to video game machine 20 via an input block 32 which is a connector, for example. Video game machine 20 performs the processing of program data stored in recording media (not shown) loaded in a recording media block (not shown) 24 and thus acts as a so-called entertainment device that plays video games or the like. In addition, portable terminal machine 30 is acts as a portable information communications terminal or Personal Digital Assistant (PDA) which has wireless communication features.

Video game machine 20 is provided with a program supply means for supplying a program to external equipment, a program reader for reading a program recorded on recording media (not shown), a CPU 21 provided with the functional of a program comparison means for performing the comparison of two programs, along with a communications block 22, controller 23, recording media block 24, main memory 25, graphics processor 26 and function block 27. In video game machine 20, these various blocks are connected by a bus 28.

The communications block 22 has functions for communicating with external equipment. Communications block 22 may be electrically connectable to the input block 32 of the portable terminal machine 30, for example, and thus the video game machine 20 can perform serial communication of data with portable terminal machine 30.

Controller 23 has functions for performing input control. To wit, in the video game machine 20, a user, for example, is able to input various types of information using this controller 23.

Recording media block 24 is where recording media (not shown) are loaded, being the portion consisting of a pickup block for reading data from the recording media and the like. Examples of the recording media include the so-called CD-ROM and the like. The recording media block 24 reads data from recording media on which are recorded programs including programs that are downloaded by the portable terminal machine 30.

Main memory 25 is a storage block for storing programs and various other types of data. For example, main memory 25 may have the function of holding the programs recorded on the recording media (not shown) loaded in recording media block 24. In addition, main memory 25 also stores data from portable terminal machine 30 that is sent via communications block 22.

Graphics processor 26 is constituted as the portion that performs image processing on input data. To wit, graphics processor 26 performs the graphics processing of images displayed on the display (not shown), for example. More specifically, graphics processor 26 also performs the so-called polygon graphics processing and the like.

Function block 27 constitutes all blocks other than those described above, for example, the (not shown) display block, power supply block or connection block for connection to a non-volatile memory card system or the like.

CPU 21 has functions for controlling the various blocks described above. For example, at the time of reading a program recorded on recording media (not shown) and downloading it to the portable terminal machine 30, CPU 21 exerts this control and controls the input/output of data with the portable terminal machine 30. In addition, CPU 21 is provided with functions for comparing a program read from recording media (not shown) and a program downloaded by portable terminal machine 30.

Video game machine 20 having such a composition is able to play video games based on the program recorded on the CD-ROM or other recording media as usual. Moreover, video game machine 20 is further designed so that the non-volatile memory card system described above is removable.

On the other hand, portable terminal machine 30 is provided with CPU 31 provided with the functions of a time comparison means that compares two times, an execution control that exerts control over the operation of programs, and a time updater that updates time information stored in a program; an input block 32 which is the connector for sending and receiving data to and from the video game machine 20; a clock 33 which is a clock for marking correct time; and a storage device 34 which is a storage means for storing the program received from the video game machine 20 or the like or other data and the like; as well as a pager receiver 35 which is a wireless reception means and a display 36 and the like. In this portable terminal machine 30, these various blocks are connected by a bus 37. Input block 32 has functions for performing communication with external equipment. This input block 32 is able to be electrically connected to the communications block 22 of video game machine 20, and thereby can perform the serial communication of data with video game machine 20. Through input block 32, portable terminal machine 30 downloads programs or the like recorded in recording media (not shown) loaded in the recording media block 24 of video game machine 20.

Clock 33 marks time. As described later, portable terminal machine 30 uses this clock 33 to determine the time of time stamp TS recorded at the time of downloading a program from the video game machine 20.

Here, time stamp TS represents time information and, as described later, is recorded in the program downloaded from video game machine 20.

With clock 33, while the user can read the time upon executing a program for checking the time, the time cannot be changed arbitrarily except by means of the correction by the pager receiver 35 to be described later.

Storage device 34 is a storage block for storing various types of data consisting of recording media (not shown) or non-volatile memory or the like, for example. This storage device 34 stores the program downloaded from the video game machine 20. In addition, the storage device 34 also stores the time stamp TS which is information that accompanies the program as the current time obtained from the clock 33 at the time that the program was downloaded from the video game machine 20. Moreover, storage device 34 also stores data from video game machine 20 input via the input block 32, or data received from an external broadcast station (not shown) via pager receiver 35 to be described later, for example.

Pager receiver 35 receives data transmitted from a broadcast station or the like (not shown) by means of IrDA or other infrared or microwave transmission. The pager receiver 35 regularly receives accurate time data from a broadcast station or the like (not shown). Thereby, the portable terminal machine 30 is constituted such that CPU 31 regularly corrects the time marked by clock 33.

Display 36 has functions for displaying various types of information. Display 36 performs the display of various types of text information and image information and the like on an LCD panel (not shown) or the like.

CPU 31 controls the operation of the various blocks described above. For example, CPU 31 takes the time recorded as the time stamp TS in the program downloaded from the video game machine 20 and adds the determined time DT to obtain the usage time limit TL and compares this against the current time obtained from clock 33. In addition, depending on the results of this comparison, CPU 31 controls the execution of the program downloaded from the video game machine 20. Moreover, CPU 31 updates the time recorded as the time stamp TS in the program downloaded from the video game machine 20. In addition, CPU 31 corrects the time of clock 33 based on the time data from pager receiver 35, and also controls the input/output of data to and from video game machine 20.

Portable terminal machine 30 having such a construction is formed so that it is removable from video game machine 20, and downloads programs from video game machine 20 and also exchanges data with video game machine 20.

In data processing system 10 consisting of video game machine 20 and portable terminal machine 30 described above, using a series of steps shown in FIGS. 2 and 3, a program is downloaded from video game machine 20 to portable terminal machine 30, and time stamp TS of the downloaded program is updated. Note that in the following explanation, the program loaded in recording media block 24 of video game machine 20 is called the master program and the program downloaded by portable terminal machine 30 and stored in storage device 34 is called the sub program, and moreover, the program running on video game machine 20 at the time that these processes are performed is called the execution program.

Figure 2:
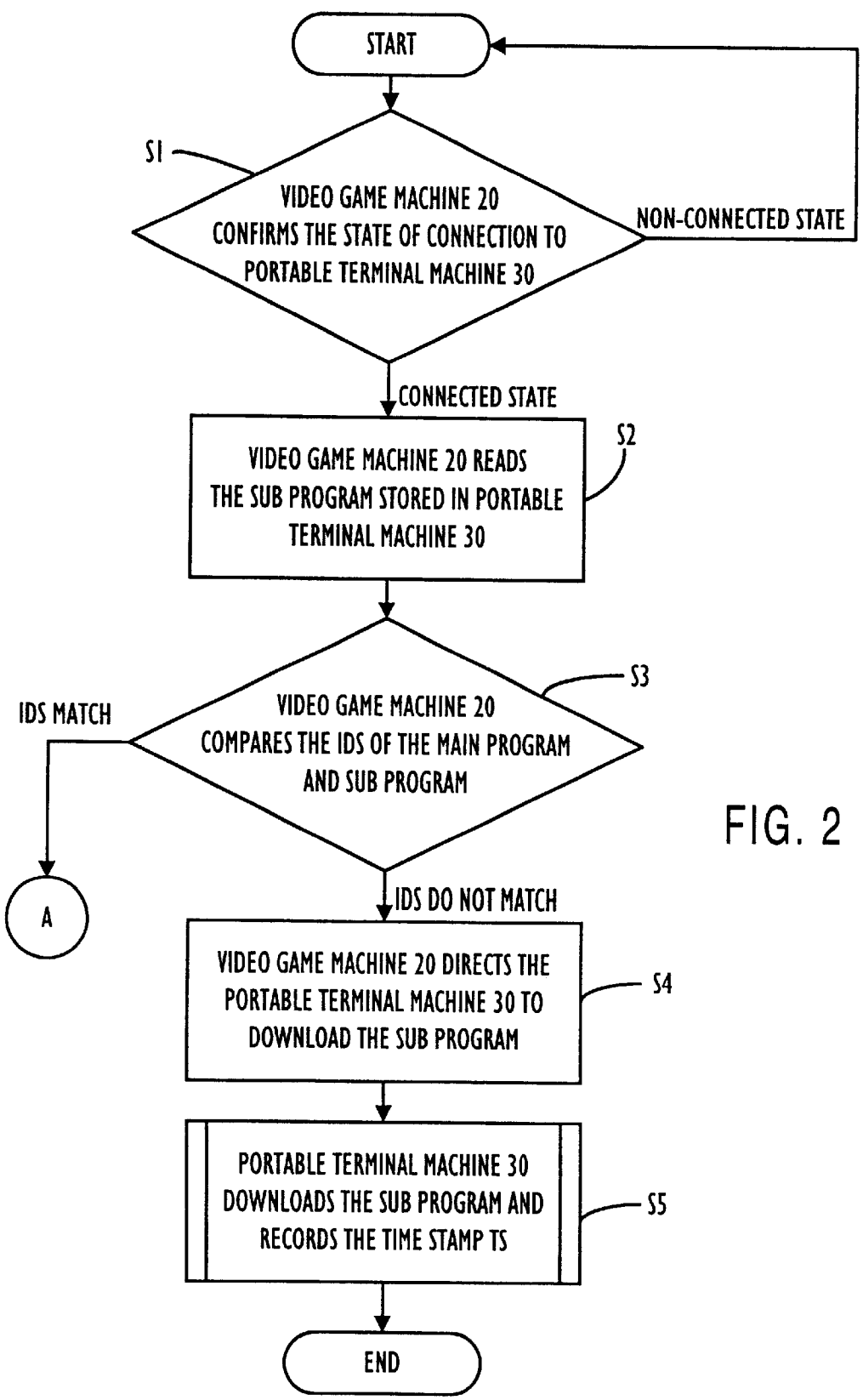
FIG. 2 is a flowchart showing a series of steps for performing the downloading of a sub program and updating of a time stamp in the data processing system, as a series of processes for performing the downloading of the sub program.

First, as shown in FIG. 2, in Step S1 the video game machine 20 determines whether or not portable terminal machine 30 is connected to video game machine 20.

Here, if portable terminal machine 30 is connected to video game machine 20, in Step S2 video game machine 20 uses CPU 21 to read the sub program stored in storage device 34 of portable terminal machine 30. However, the portable terminal machine 30 is not connected to the video game machine 20, video game machine 20 repeats the processing of Step S1.

Next, video game machine 20 uses CPU 21 to compare the sub program stored in portable terminal machine 30 that was read in Step S2 and the main program read from the recording media loaded in recording media block 24 of video game machine 20, and in Step S3 determines whether or not the IDs of these programs match.

Here, the ID is defined to be identification information for the program that is contained in such information as, for example, file name FN and file size FS to be described later.

In Step S3, if the sub program stored in the storage device 34 of portable terminal machine 30 does not match the main program recorded on the recording media, in Step S4, video game machine 20 orders portable terminal machine 30 to download the sub program and uses CPU 21 to supply the main program on the recording media to storage device 34 of portable terminal machine 30 and make it the sub program.

Upon receiving this order, portable terminal machine 30 downloads the sub program in Step S5. At this time, the portable terminal machine 30 takes the time obtained from clock 33 at the time that the sub program was downloaded, records it in the sub program as time stamp TS and stores that sub program in storage device 34.

This completes the download of the sub program to portable terminal machine 30 in the data processing system 10.

Figure 3:
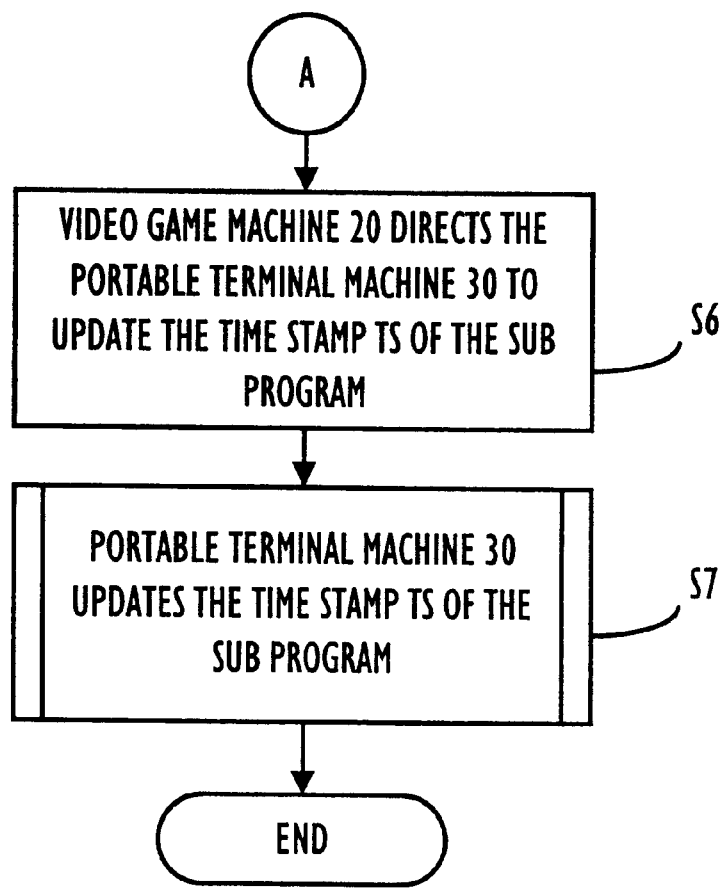
FIG. 3 is a flowchart showing a series of steps for performing the downloading of the sub program and updating of a time stamp in the data processing system, as a series of processes for performing the updating of the aforementioned time stamp of the aforementioned sub program.

On the other hand, when the sub program stored in storage device 34 of portable terminal machine 30 is compared with the main program recorded on the recording media in Step S3, if the IDs of these programs match, namely the sub program had been downloaded from the main program recorded on the same recording media, as shown in Step S6 of FIG. 3, video game machine 20 orders portable terminal machine 30 to update time stamp TS of the sub program.

Upon receiving this order, in Step S7 the portable terminal machine 30 uses CPU 31 to change (update) time stamp TS of the sub program stored in storage device 34 to the current time obtained from clock 33.

This completes the update of time stamp TS of the sub program in the data processing system 10.

Figure 4:
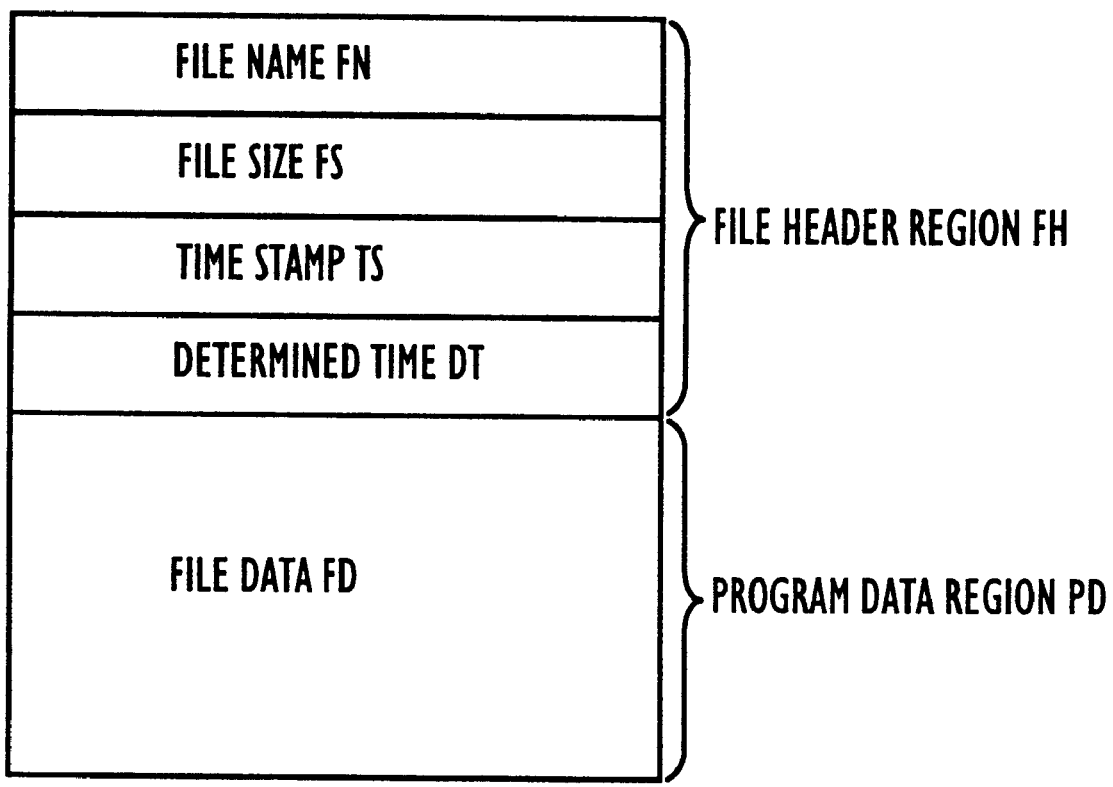
FIG. 4 is a schematic diagram showing the format of the sub program.

The format of the sub program that was downloaded to portable terminal machine 30 or had its time stamp TS updated by means of these steps has a structure such as that shown in FIG. 4. To wit, the sub program downloaded from video game machine 20 to portable terminal machine 30 has a program data region PD and a file header region FH.

The program data region PD consists of the actual data of the sub program. On the other hand, the file header region FH consists of a file name FN used to identify the name of the sub program, the file size FS that indicates its size, time stamp TS that indicates the time when the sub program was downloaded or the time when it was updated, and the determined time DT which is set as the trial-use period for the sub program.

To wit, when the video game machine 20 determines in Step S3 whether or not the sub program stored in portable terminal machine 30 that was read in Step S2 and the main program read from the recording media loaded in the recording media block 24 of video game machine 20 match, this determination may be made by referring to file name FN and file size FS, for example.

Note that the series of steps described above are performed under the control of the execution program running in video game machine 20.

Figure 5:
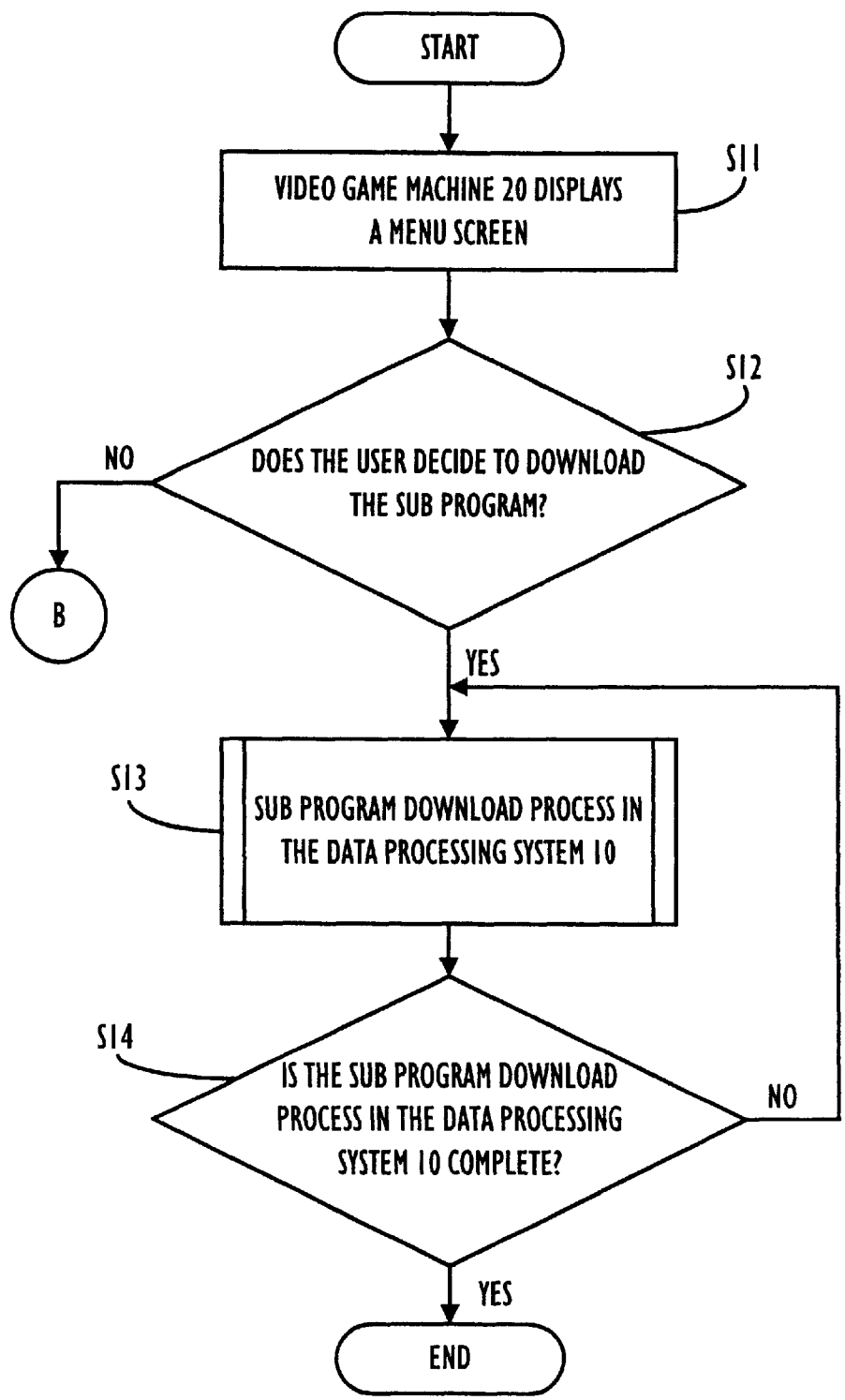
FIG. 5 is a flowchart showing a series of steps for performing the download processing of the sub program and update processing of the time stamp in the aforementioned data processing system, as a series of processes for performing the download processing of the sub program.
Figure 6:
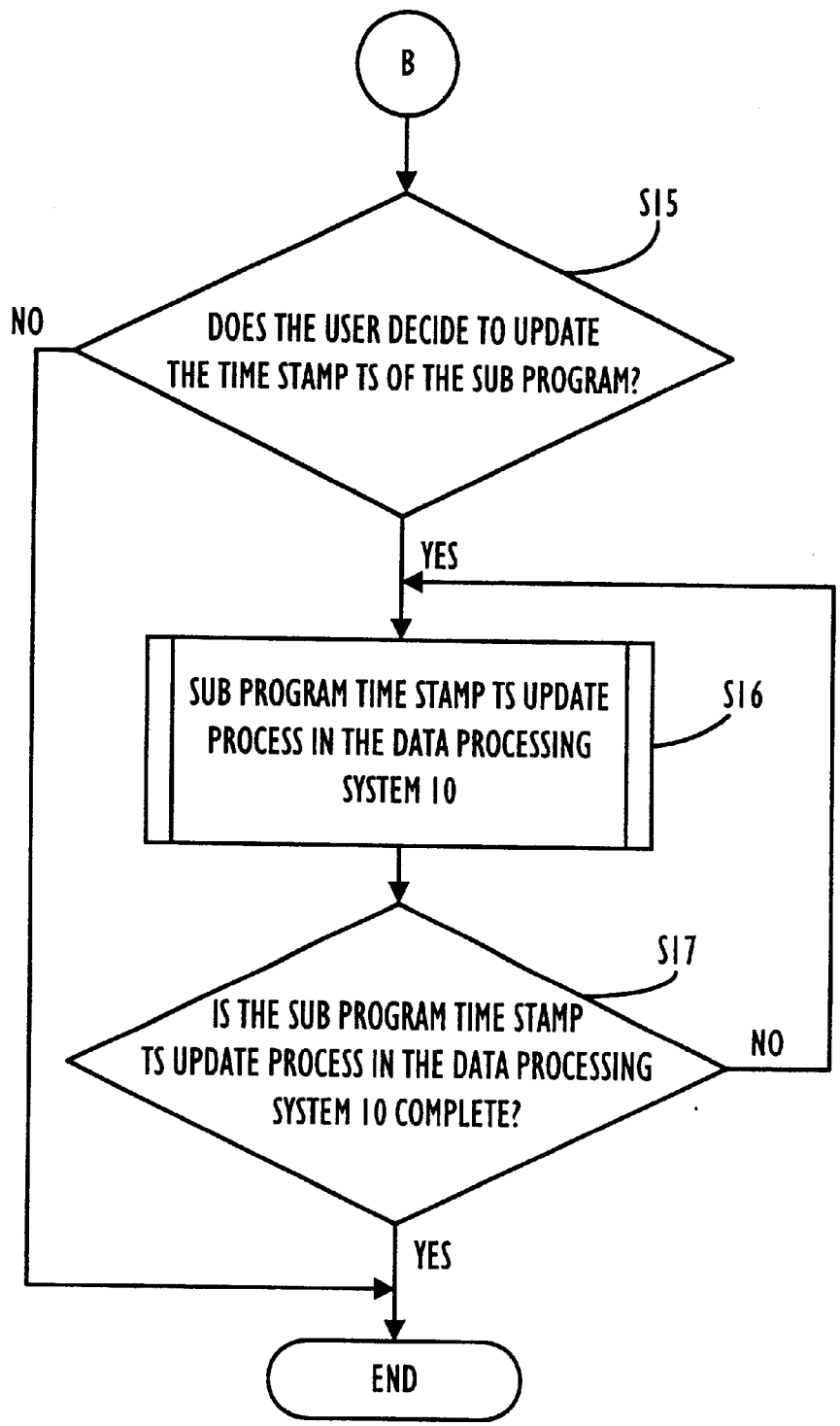
FIG. 6 is a flowchart showing a series of steps for performing the download processing of the sub program and update processing of the time stamp in the data processing system, as a series of processes for performing the update processing of the time stamp of the sub program.

Specifically, when the execution program is run in video game machine 20, the series of processes described in the steps of FIGS. 5 and 6, for example, are performed.

As shown in FIG. 5, in Step S11 video game machine 20 displays a menu screen on the display (not shown).

For example, this menu screen may display a menu bar or the like that permits the user to make a selection as to whether or not the sub program is to be downloaded to portable terminal machine 30.

In the video game machine 20, in Step S12 the user follows the menu displayed on the display (not shown) and uses controller 23 to make a selection as to whether or not the sub program is to be downloaded from the recording media loaded in video game machine 20 to portable terminal machine 30.

Here, if the selection to perform the download is made, in Step S13 the download processing is performed in the data processing system 10. Note that this download processing is defined to be performing the processing of Step S1 through Step S5 shown in FIG. 2.

Next, in the data processing system 10, in Step S14 a determination is made as to whether or not the download processing described above is complete, and if it is determined to be complete, the download processing is terminated and the operation of the execution program is terminated. However, if the download processing is determined not to be complete, the processing in data processing system 10 is repeated starting from Step S13.

On the other hand, if a selection is made in Step S12 to the effect that the sub program is not to be downloaded to portable terminal machine 30, in video game machine 20, as shown in Step S15 of FIG. 6, the user can select whether or not to update time stamp TS of the sub program already stored in storage device 34 of portable terminal machine 30.

When the selection is made in Step S15 to update time stamp TS, in Step S16 the update processing is performed in the data processing system 10. Note that the ☐update processing☐ referred to here means performing Steps S1 through S3 of FIG. 2 and Steps S6 through S7 of FIG. 3.

Then, in data processing system 10, in Step S17 a determination is made as to whether or not time stamp TS update processing described above is complete, and if it is determined to be complete, the update processing is terminated and the operation of the execution program is terminated. However, if the download processing is determined not to be complete, the processing in data processing system 10 is repeated staring from Step S16.

In this manner, in data processing system 10, the execution program can be executed to download a sub program to portable terminal machine 30 from the main program stored in the recording media loaded in video game machine 20.

In addition, in data processing system 10, if the sub program to be downloaded to portable terminal machine 30 is the same one downloaded from the recording media loaded in video game machine 20, time stamp TS of the sub program stored in portable terminal machine 30 can be updated whenever required.

Figure 7:
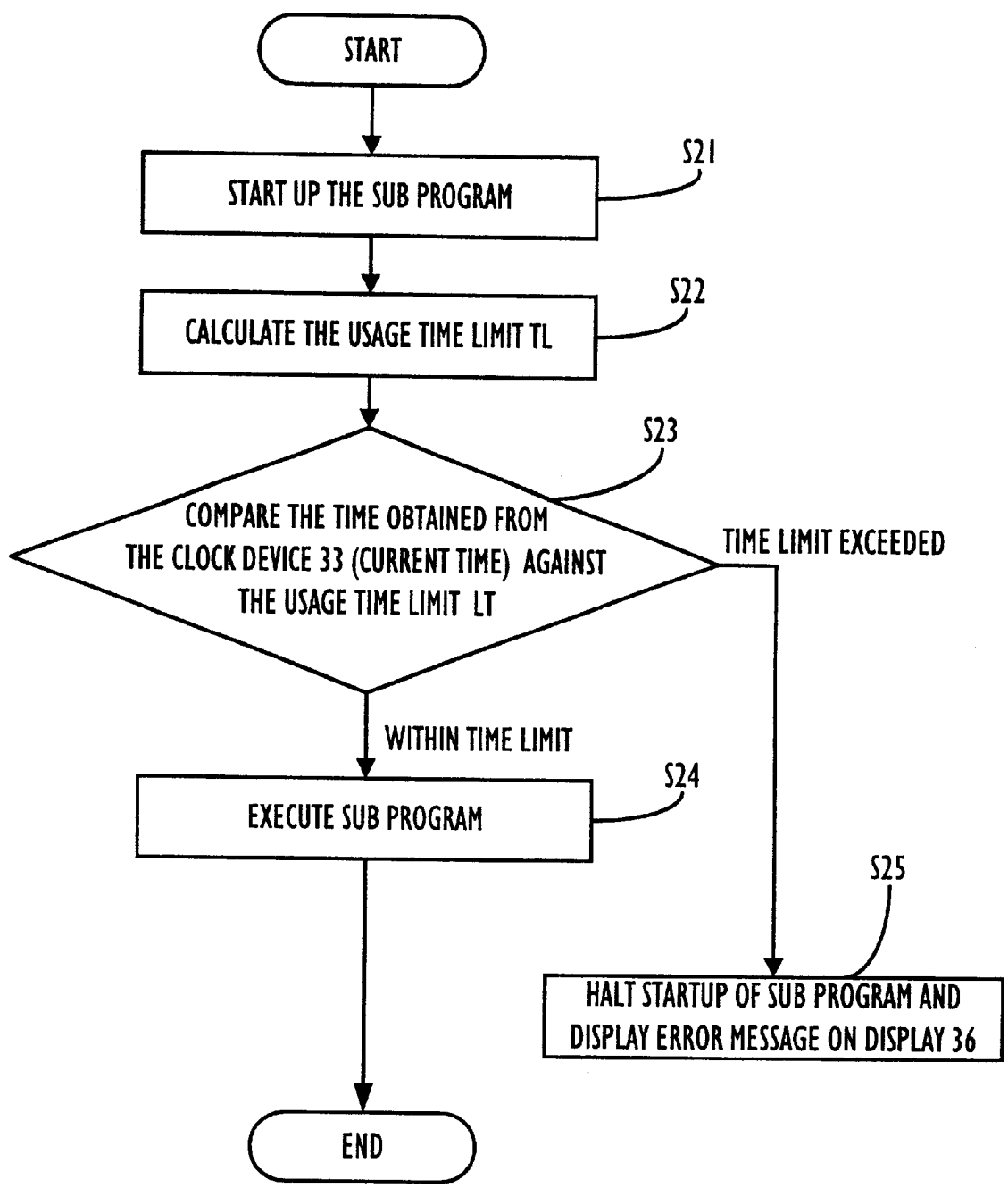
FIG. 7 is a flowchart showing a series of processes for executing the program downloaded to the portable terminal machine in the portable terminal machine.

In FIG. 7 the series of processes performed at the time of the execution in portable terminal machine 30 of the sub program downloaded from recording media loaded in video game machine 20 is described.

In Step S21 portable terminal machine 30 starts up the sub program downloaded from the main program recorded on recording media loaded in video game machine 20, and in Step S22 adds the determined time DT to time stamp TS recorded in file header region FH of the sub program to calculate usage time limit TL.

Then, in Step S23 portable terminal machine 30 uses CPU 31 to compare usage time limit TL against the current time obtained from clock 33, to determine whether or not the current time is a time before the time limit TL.

Here, if the current time is a time before usage time limit TL, the portable terminal machine 30 uses the CPU 31 to continue the execution of the sub program as in Step S24.

On the other hand, if the current time is a time after usage time limit TL, namely the current time has exceeded usage time limit TL, in Step S25 portable terminal machine 30 halts the startup of the sub program by CPU 31 and displays on display 36 an error message to the effect that the sub program cannot be started up.

By means of the series of processing explained above, in the data processing system 10, at the time that a sub program downloaded from a main program recorded on recording media loaded in video game machine 20 is to be executed in portable terminal machine 30, the current time obtained from the clock 33 is always compared against the usage time limit TL calculated by adding the determined time DT to time stamp TS recorded in the sub program, and thus execution of the sub program can be prevented when usage time limit TL has been exceeded.

In this manner, in data processing system 10, at the time that a program is downloaded from video game machine 20 to portable terminal machine 30, it is possible to set the time period over which the sub program is usable. For this reason, in data processing system 10, only a user who possesses the main program can extend usage time limit TL of the sub program by regularly updating time stamp TS of the sub program stored in portable terminal machine 30. Therefore, in data processing system 10, it is possible to prevent the illegal use of a sub program whose usage time limit TL has been exceeded by a user who does not possess the main program.

In addition, in data processing system 10, time stamp TS of the sub program is determined by the time obtained from clock 33 in portable terminal machine 30. Clock 33 cannot be altered intentionally by the user, but rather it is regularly corrected by CPU 31 based on absolutely accurate time information received by pager receiver 35, so an absolutely accurate time can be indicated nearly at all times. Therefore, in data processing system 10, usage time limit TL of the sub program can be managed reliably.

Moreover, in data processing system 10, since usage time limit TL of the sub program can be managed reliably, determined time DT of the sub program can be used as a trial-use period.

The present invention is not limited to the mode of working described above, and in video game machine 20, there is no need for the main program to be recorded on CD-ROM or other recording media, but rather it may also be obtained, for example by communication with the outside.

In addition, in data processing system 10, the program is not the only thing read from the recording media by CPU 21 which is the program reading means of video game machine 20, as it is also possible to read normal data or the like, and this data or the like can be supplied to portable terminal machine 30.

Moreover, in data processing system 10, it is also possible to delete a sub program whose usage time limit TL has been exceeded at the time of the download processing or update processing described above.

Furthermore, the format of the sub program is not limited to that shown in FIG. 4, but rather, the region for determined time DT may be replaced with usage time limit TL, for example. By doing this, in data processing system 10, there is no need to calculate usage time limit TL in Step S22 shown in FIG. 7, so it is sufficient to reference usage time limit TL.

In addition, in data processing system 10, the main program and the execution program are different programs, but there is no need for them to be limited to this construction, as the main program may be a program that includes a program equivalent to the execution program. To wit, in data processing system 10, the main program may or may not be running in video game machine 20 during the download processing or update processing described above.

FIGS. 8–12 demonstrate a specific example in which data processing system 10 presented as the mode of working described above is presented more specifically as an entertainment system. In these FIGS. 8–12, video game machine 20 and portable terminal machine 30 which make up data processing system 10 described above make up an entertainment system consisting of a video game device 301 and a portable electronic device 400.

To wit, video game machine 20 corresponds to video game device 301 and portable terminal machine 30 corresponds to portable electronic device 400. Specifically, regarding the correspondence of video game machine 20 to video game device 301, CPU 21 of video game machine 20 described above corresponds to CPU 351 of video game device 301 shown in FIG. 11. In addition, CPU 31, input block 32, clock 33, storage device 34 and pager receiver 35 of portable terminal machine 30 correspond to the controller 441, connector 442, clock function block 445, non-volatile memory 446 or program memory block 441a and wireless receiver 449, respectively, shown in FIG. 12A.

Figure 8:
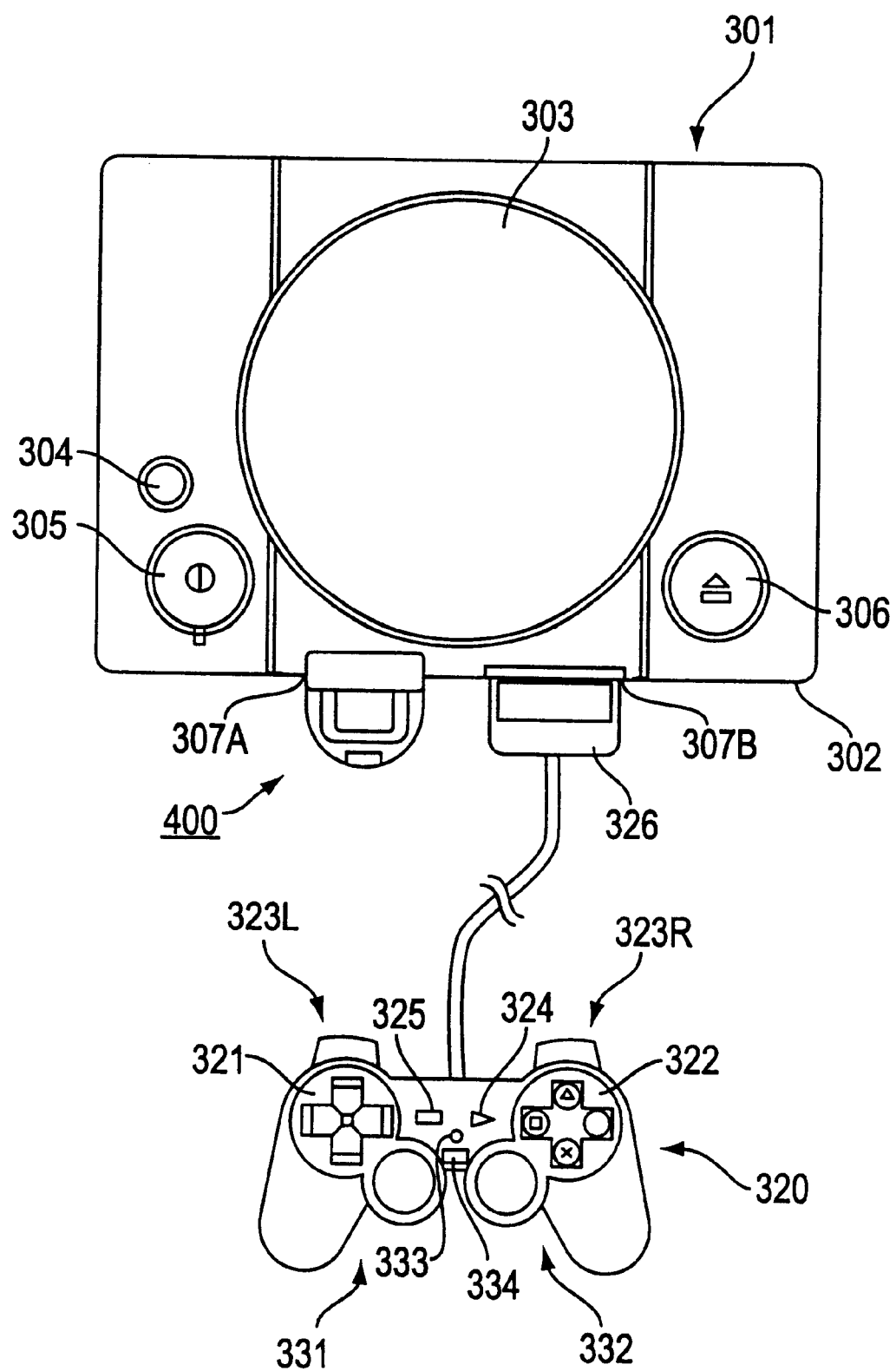
FIG. 8 is a plan view showing the structure of an entertainment system which is a specific example of the data processing system consisting of the video game machine and the portable terminal machine.
Figure 9:
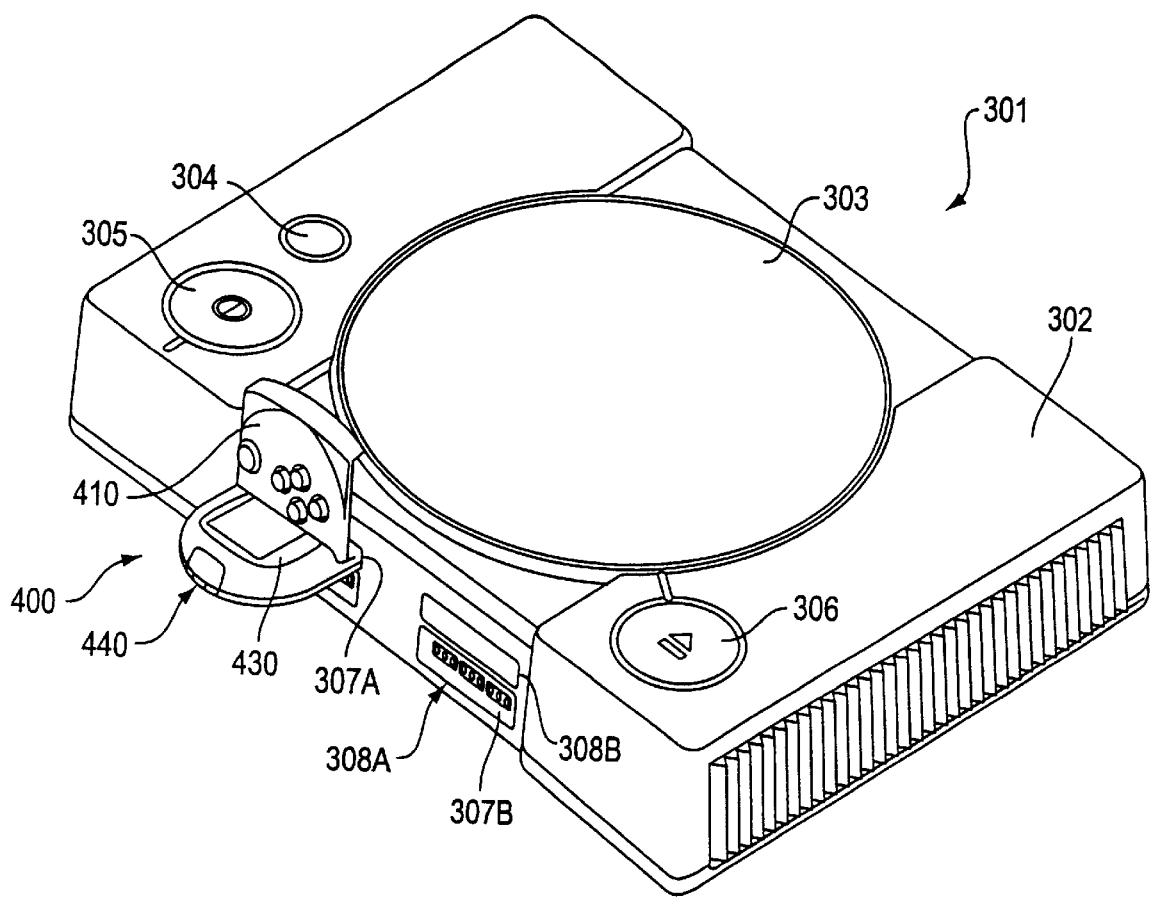
FIG. 9 is a perspective view showing the structure of the entertainment system.

As shown in FIGS. 8 and 9, video game device 301 reads a program recorded on recording media and executes the program in response to the direction of the user (game player). Here, the execution of a game means mainly the control of the progress, display and audio portions of games.

Main unit 302 of the video game device 301 is enclosed in a roughly rectangular enclosure, which is provided with a disc loading block 303 in the center where a CD-ROM or other optical disk is loaded as the recording media on which are recorded programs such as video games or a main program to be downloaded to portable electronic device 400; a reset switch 304 for intentionally resetting the video game, a power switch 305, a disc change switch 306 used when loading the optical disk described above, and two slots 307A and 307B.

Video game device 301 is configured so that the program can be supplied not only from the recording media but also via a communications circuit.

Slots 307A and 307B are places to which a portable electronic device 400 or controller 320 can be connected. In addition, a memory card system (not shown) can also be connected to these slots 307A and 307B.

Controller 320 has first and second control blocks 321 and 322, an L button 323L, an R button 323R, a start button 324, a select button 325, control blocks 331 and 332 that are capable of analog control, a mode select switch 333 that selects the control mode of these control block 331 and 332 and a display block 334 used to display the selected control mode. In addition, a vibrating mechanism (not shown) is provided in the interior of the controller 320. This vibrating mechanism may transmit vibration to the controller 320 depending on the progress of the video game, for example. The controller 320 is electrically connected to slot 307B of the main unit 302 by means of a connector 326.

For example, by connecting two controllers 320 to the slots 307A and 307B, two users are able to share this entertainment system so they can play head-to-head games. Slots 307A and 307B are not necessarily limited to two sets as in this example.

Figure 10A:
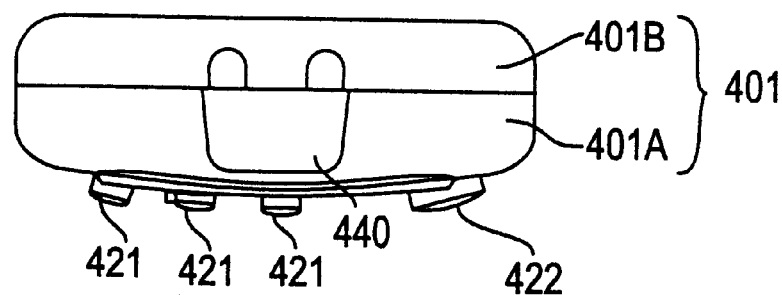
FIG. 10 is a diagram showing the structure of a portable electronic device which is a specific example of the portable terminal machine.
Figure 10B:
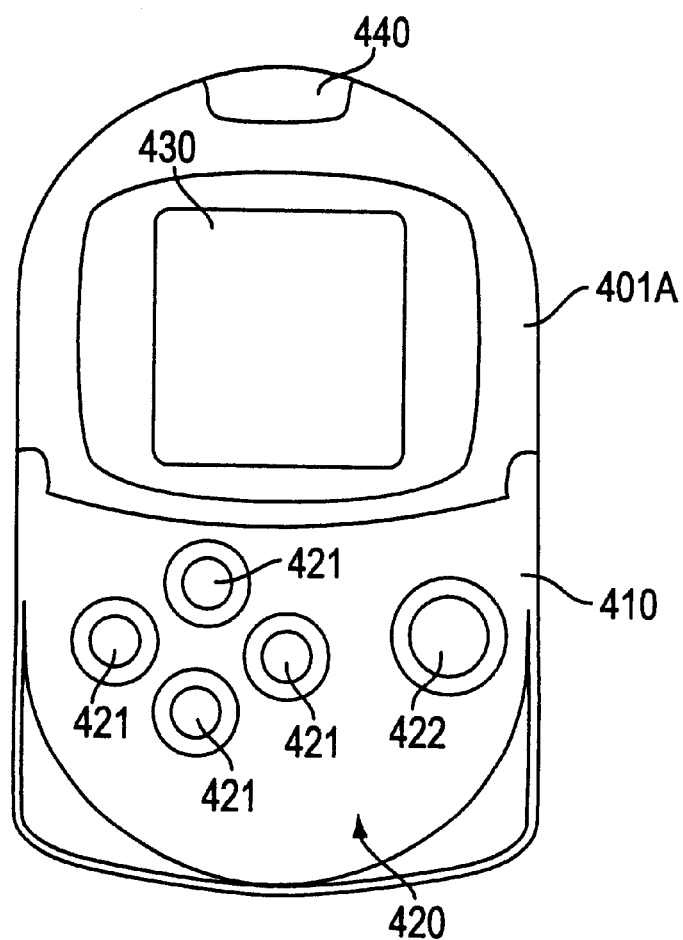
Figure 10C:
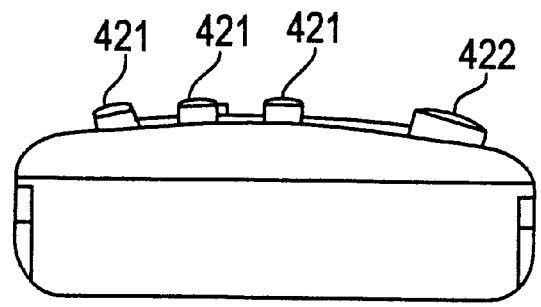

As shown in FIGS. 10A through 10C, portable electronic device 400 has a housing 401, and is provided with a control block 420 for the input of various types of information, a display 430 consisting of a liquid-crystal display (LCD) or the like, and a window 440 for performing wireless communication by infrared, for example, using a wireless communication means 448.

Housing 401, consisting of an upper shell 401a and a lower shell 401b, internally contains boards carrying memory elements and the like. This housing 401 is of a shape such that it can be inserted into the slots 307A and 307B of main unit 302 of video game device 301.

Window 440 is provided at the other end of the roughly oval-shaped housing 401. Display 430 occupies roughly half of the area of upper shell 401a constituting housing 401 and is provided at a position near window 440.

Control block 420 has one or more buttons 421 and 422 used for event input or performing various selections, and is formed on upper shell 401a in the same manner as window 440, and is provided on the opposite side from window 440 while occupying roughly half of the area. Control block 420 is formed upon a cover member 410 that is rotatably supported by housing 401. Buttons 421 and 422 are disposed so that they penetrate cover member 410 from the upper surface of cover member 410 to the lower surface. Moreover, buttons 421 and 422 are supported by cover member 410 so that they are able to move in the direction so that they appear and disappear from the upper surface of cover member 410.

The portable electronic device 400 has a board within housing 401 in a position facing the disposition position of cover member 410, and switch contacts are provided on this board. When cover member 410 is in the closed state, the switch contacts are provided in positions corresponding to the positions of the various buttons 421 and 422. Thereby, when buttons 421 and/or 422 are pressed, the switch contacts contact diaphragm switches or other pressure switches.

As shown in FIG. 9, portable electronic device 400 on which control block 420 and the like are formed on cover member 410 is inserted into main unit 302 of video game device 301 with cover member 410 in the open state.

This completes a description of the appearance of video game device 301 and portable electronic device 400.

Figure 11:
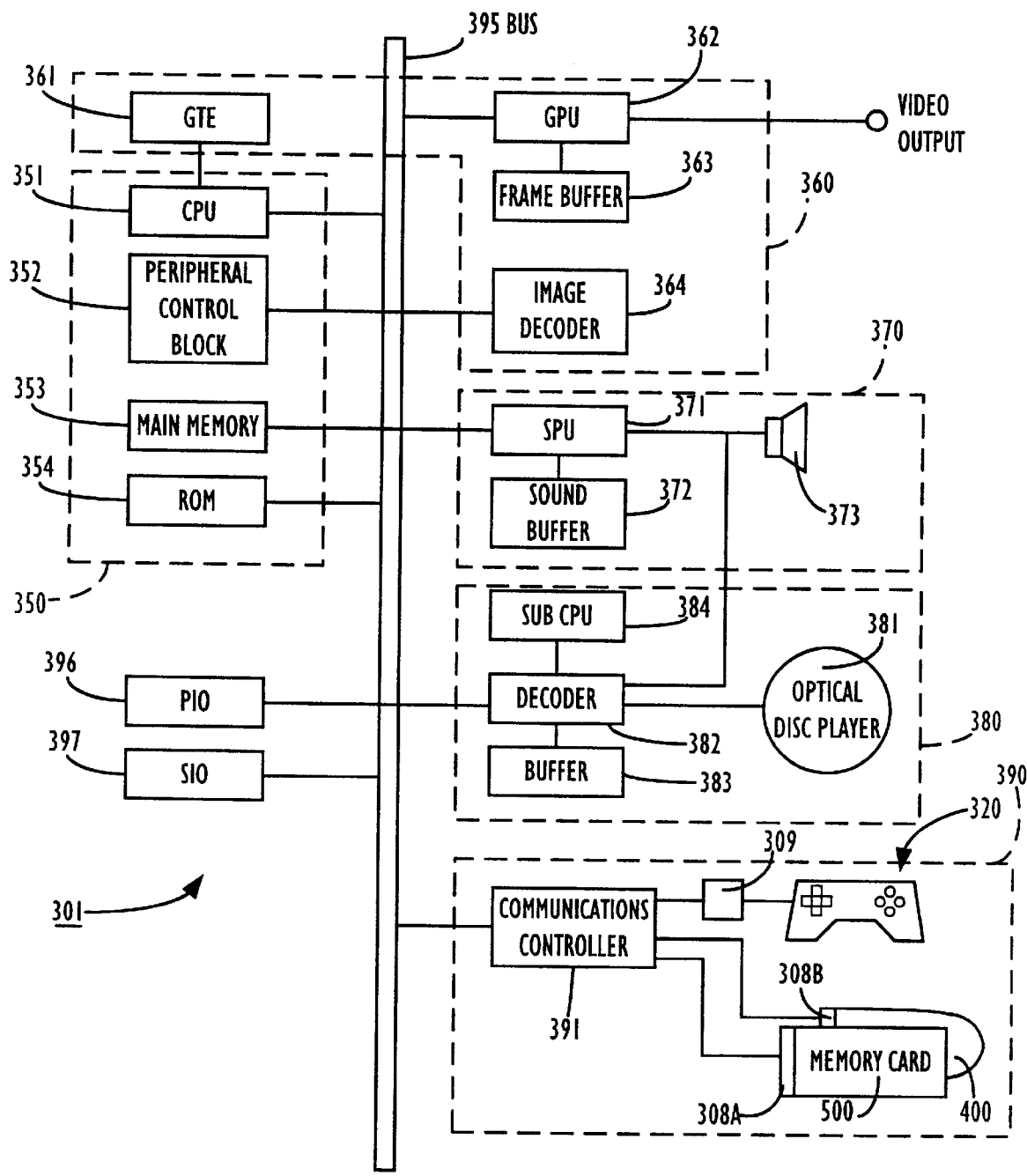
FIG. 11 is a block diagram showing the structure of a video game device which is a specific example of the video game machine.

The circuit structure of video game device 301 and portable electronic device 400 is as shown in FIGS. 11 and 12.

As shown in FIG. 11, video game device 301 is provided with a control system 350 consisting of a central processing unit (CPU) 351 and the peripherals thereof, a graphics system 360 consisting of a graphic processing unit (GPU) 362 that performs rendering in a frame buffer 363 and the like, a sound system 370 consisting of a sound processing unit (SPU) that generates music and sound effects and the like, an optical disc control block 380 that performs the control of the optical disc on which the program is recorded, a communications control block 390 that controls signals from the controller 320 through which are input the directions from the user, the memory card (not shown) that stores game settings and the like and the input/output of data from portable electronic device 400, a bus 395 that connects each of the blocks described above, and a parallel I/O interface (PIO) 396 and serial I/O interface (SIO) 397 that constitute the interface with other equipment.

The control system 350 is provided with the CPU 351, a peripheral control block 352 that performs interrupt control and control of direct memory access (DMA) and the like, a main memory (main storage unit) 353 consisting of random access memory (RAM), and a read-only memory (ROM) 354 that stores programs such as the so-called operating system that manages the main memory 353, graphics system 360, sound system 370 and the like.

CPU 351 controls this entire video game device 301 by executing the operating system stored in the ROM 354.

For example, when the power to video game device 301 is turned on, CPU 351 of control system 350 executes the operating system stored in ROM 354 and thus CPU 351 begins to control graphics system 360, sound system 370 and the like. When the operating system is executed, CPU 351 initializes the entire video game device 301 in order to verify operation or the like, and then controls optical disc control block 380 so that the program recorded on the optical disk is executed. By executing this program, CPU 351 controls graphics system 360 and sound system 370 and the like in response to input from the user, and thus controls the display of images and the generation of sound effects and music.

Note that CPU 351 corresponds to CPU 21 of video game machine 20 described above, and namely it performs restoration processing for the data received by the portable electronic device 400.

For example, the graphics system 360 may have the function of graphics processor 26 of video game machine 20 described above. Graphics system 360 is provided with a geometry transfer engine (GTE) 361 that performs coordinate conversion and other processing GPU 362 performs the rendering of images according to rendering directions from CPU 351, frame buffer 363 stores images rendered by GPU 362, and image decoder 364 decodes image data that is compressed and encoded by discrete cosine transforms or other orthogonal transforms.

GTE 361 is equipped with a parallel processing mechanism that can execute a plurality of operations in parallel, for example, and can rapidly perform coordinate conversion, light-source calculations, parallel and vector and other operations in response to operation requests from CPU 351. Specifically, in the case of performing the operation of flat shading in which one triangular polygon is rendered in the same color, GTE 361 can perform the coordinate operations for a maximum of roughly 1,500,000 polygons per second, and thereby, in video game device 301, the load on CPU 351 can be reduced and also, coordinate operations can be performed rapidly.

In addition, in accordance with rendering instructions from CPU 351, GPU 362 performs the rendering of polygons or the like in frame buffer 363. TGPU 362 can perform the rendering of a maximum of roughly 3,600,000 polygons per second.

Moreover, frame buffer 363 consists of so-called dual-port RAM, so rendering from GPU 362 and transfer from main memory 353 can be performed simultaneously with reading for display purposes. Frame buffer 363 may have a capacity of 1 MB, for example, so it is handled as a matrix of 1024 pixels horizontally by 512 pixels vertically, each 16 bits deep.

In addition, frame buffer 363 is provided with a display region for output as video output, along with a CLUT region that stores a color look-up table (CLUT) that is referenced when GPU 362 performs the rendering of polygons or the like, and a texture region that stores textures that are subjected to coordinate conversion at the time of rendering and mapped to polygons or the like rendered by means of GPU 362. The CLUT region and texture region are dynamically updated according to updates to the display region.

Under the control of CPU 351, image decoder 364 decodes still or motion picture image data stored in main memory 353 and stores it in main memory 353. By storing the image data thus restored in frame buffer 363 via GPU 362, it can be used as the background for images rendered by GPU 362.

Sound system 370 is provided with an SPU 371 that generates music and sound effects and the like under the direction of CPU 351, a sound buffer 372 that stores waveform data and the like by mean of SPU 371, and a speaker 373 that provides output of the music and sound effects and the like generated by SPU 371.

SPU 371 is provided with an ADPCM decoder function for restoring sound data that is converted from 16-bit sound data to a 4-bit differential signal by adaptive differential PCM (ADPCM); a playback function for generating sound effects or the like by playing back waveform data stored in sound buffer 372, and a modulation function for modulating and playing back waveform data stored in sound buffer 372.

Sound system 370 can be used as a so-called sampling sound source by generating music and sound effects and the like based on waveform data stored in sound buffer 372 based on directions from CPU 351.

Optical disc control block 380 is provided with optical disc player 381 that plays back programs and data and the like recorded on a CD-ROM or other optical disc, a decoder 382 that decodes programs and data and the like that is recorded with the addition of error correction codes (ECC), for example, and a buffer 383 that speeds up the reading of data from the optical disk by temporarily storing data from the optical disc player 381. Sub CPU 384 is connected to the decoder 382.

The audio data recorded on the optical disc that is read by optical disc player 381 includes, in addition to the ADPCM data mentioned above, the so-called PCM data consisting of an audio signal subjected to analog/digital conversion. Here, as the ADPCM data, audio data recorded by expressing the differentials of 16-bit digital in 4 bits is decoded by decoder 382 and then supplied to SPU 371, the digital/analog conversion and other processing is performed in SPU 371 and then it is used to drive speaker 373. In addition, as the PCM data, audio data recorded as 16-bit digital data is decoded by decoder 382 and then used to drive speaker 373.

Moreover, communications control block 390 is provided with a communications controller 391 that performs the control of communications with CPU 351 via bus 395, and a communications controller 391 is provided to perform the control of communication with controller connector 309 connected to controller 320 for input of directions from the user along with the memory card (not shown) as auxiliary storage for storing game settings and other data, as well as memory card slots 308A and 308B to which is connected portable electronic device 400 as shown in FIG. 9.

Video game device 301 having the structure described above can have functions similar to those of video game machine 20 described above.

To wit, video game device 301 downloads a program or the like recorded on the recording media via communications controller 391 to portable electronic device 400.

Figure 12A:
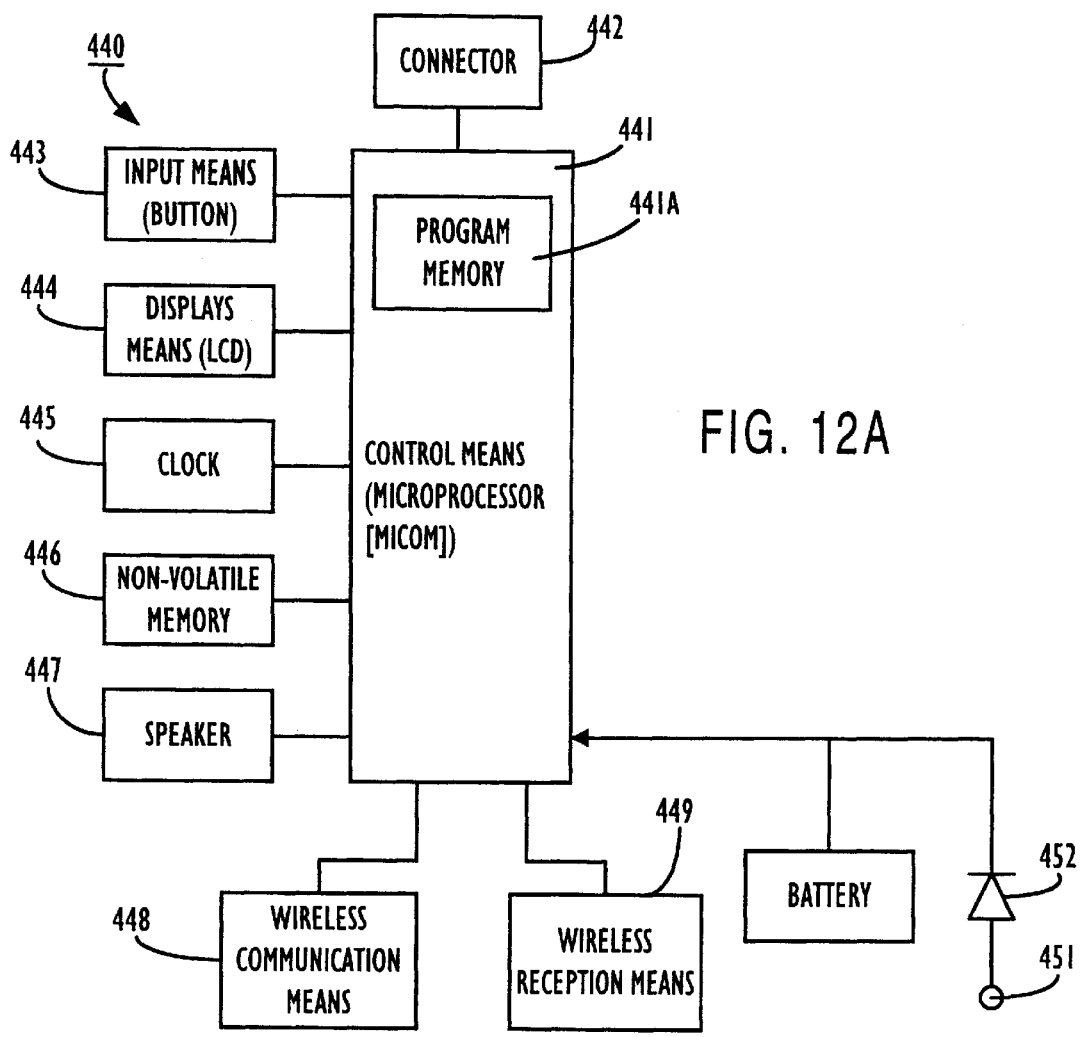
FIG. 12 is a block diagram showing the structure of the portable electronic device which is a specific example of the portable terminal machine.

On the other hand, as shown in FIG. 12A, portable electronic device 400 is provided with a controller 441, connector 442, input means 443, display means 444, clock function block 445, non-volatile memory 446, speaker 447, wireless communicator 448 and wireless receiver 449 as means of exchanging data, battery 450, power supply terminal 451 that constitutes a power storage means and a diode 452.

Control means 441 may be constituted using a microcomputer (abbreviated as micom in the figure). For example, controller 441 may be constituted as having the functions of CPU 31 of portable terminal machine 30 described above. Controller 441 internally has a program memory block 441a which provides the program storage.

Connector 442 constitutes input block 32 of the portable terminal machine 30 described above and consists of a connector for connecting to the slots of other information equipment or the like.

Input device 443 consists of control buttons for controlling the stored program.

Display 444 constitutes the display 36 of the portable terminal machine 30 described above. Display 444 may consist of a liquid-crystal display (LCD) or the like, which is a display for displaying various types of information.

The clock function block 445 constitutes clock 33 of the portable terminal machine 30 described above. Clock function block 445 displays time, and may display the time on display 444, for example. In addition, clock function block 445 also determines the time when a program is downloaded from video game device 301, and this time is recorded in the sub program as the time stamp and also stored in non-volatile memory 446 of portable electronic device 400.

Non-volatile memory 446 is a device that stores various types of data. The memory used for non-volatile memory 446 may be flash memory or other type of semiconductor memory device that maintains the stored information even if the power is turned off.

Portable electronic device 400 is provided with a battery 450 so static random access memory (SRAM) capable of high-speed input/output of data may also be used for the non-volatile memory 446.

Non-volatile memory 446 corresponds to the storage device 34 of the portable terminal machine 30 described above, so it stores the sub program downloaded from the main program recorded in the recording media or the like of video game device 301.

In addition, since portable electronic device 400 is provided with a battery 450, it is able to operate independently when removed from slots 307A and 307B of main unit 302 of video game device 301.

Battery 450 may be a rechargeable secondary cell, for example. When portable electronic device 400 is inserted in slots 307A and 307B of video game device 301, battery 450 is supplied with power from video game device 301. In this case, power terminal 450 is connected to the connection end of battery 450 via a backflow-prevention diode 451, and power is supplied at the time of connection to main unit 302 of video game device 301.

Wireless communicator 448 is the portion that performs data communication with external equipment by means of infrared or the like. In addition, wireless communicator 448 is also the portion that receives various types of data sent from other memory cards or the like.

Wireless receiver 449 is the portion that receives absolutely accurate time information for correcting the time indicated by clock function block 445, for example, or various types of data that are sent by wireless broadcast.

Speaker 447 is a sound generation means that generates sounds depending on the program or the like.

The various blocks described above are each connected to control means 441 and operate according to the control of control means 441.

Figure 12B:
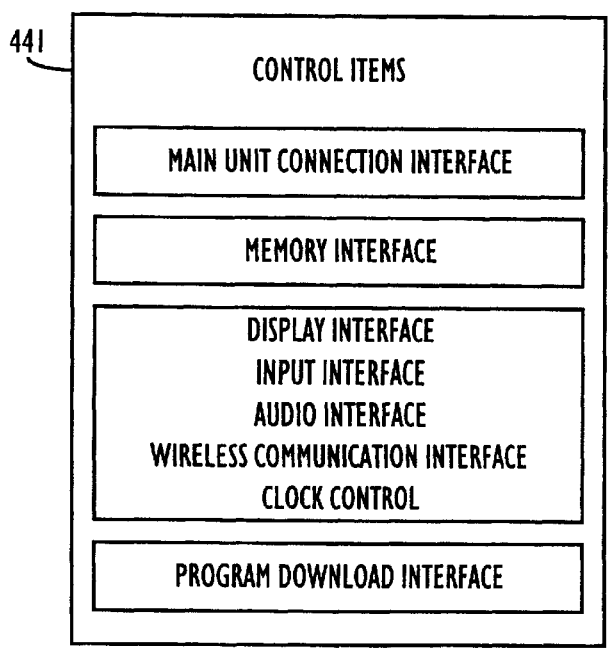

The control items for control means 441 are those shown in FIG. 12B. Control means 441 is provided with a main unit connection interface to information equipment, a memory interface for the input/output of data to and from memory, a display interface, a control input interface, an audio interface, a wireless communication interface, clock control and a program download interface.

Portable electronic device 400 is provided with the functions of portable terminal machine 30 explained previously along with button switches or other input means 443 for controlling the executing program and a display means 444 that uses a liquid-crystal display (LCD) or the like, and thus it also has the functions of a portable game device that can run game applications.

Moreover, portable electronic device 400 also has the function of being able to store programs or a sub program downloaded from the main unit of video game device 301 in program memory block 441a within the microcomputer 441, so the programs and various types of driver software that runs on portable electronic device 400 can be easily changed.

In addition, portable electronic device 400 can have the same functions as the portable terminal machine 30.

To wit, portable electronic device 400 downloads a sub program via connector 442 from the main program recorded on the CD-ROM or the like loaded in video game device 301 and stores this sub program in non-volatile memory 446 or program memory block 441a. At this time, the current time obtained from clock function block 445 is added to the sub program as time stamp TS, and determined time DT or usage time limit TL information is also added. Portable electronic device 400 receives regular input of an absolutely accurate time via wireless receiver 449 from an outside broadcast station or the like, and control means 441 regularly corrects the time indicated by clock function block 445. When the sub program is executed in portable electronic device 400, control means 441 determines whether or not usage time limit TL of the sub program has been exceeded, and halts the startup of that sub program if usage time limit TL of the sub program has been exceeded.

Data processing system 10 consisting of a video game machine 20 and a portable terminal machine 30 is able to prevent the illegal downloading of sub programs and can also function as an entertainment system.

As described in detail above, in the data processing system, a sub unit is removably connected via a connection means to a main unit that performs data processing, the main unit uses a program supply to supply a program to the sub unit, and the sub unit stores the supplied program and the time of communication with the main unit, and a time comparator compares a usage time limit, which is a time limit until when the program is executable in the sub unit and which is obtained based on the time of communication, against a time obtained from the clock, and exerts control of the execution of the program based on the results of this comparison.

Thereby, in the data processing system it is possible for the program provided by the main unit to be downloaded to the sub unit, and the usage time limit obtained based on the time when the download occurred to be compared against the current time obtained from the clock, and the execution of the program downloaded to the sub unit to be controlled depending on the results.

In addition, in the data processing system, the program supplied from the main unit to the sub unit is that read by means of a program reader from a recording medium removably loaded into the main unit. The main unit uses a program comparison means to compare the program stored in the sub unit storage against that which is read from the recording medium by the program reader. The sub unit uses a time updater to update the usage time limit of the stored program depending on these results of comparison.

Thereby, the data processing system compares the program which is read by the main unit from the recording medium against the program stored in the sub unit and thus it is possible to update the usage time limit of the program stored in the sub unit depending on whether or not the program stored in the sub unit is that which is read from the recording medium loaded in the main unit.

Moreover, in the data processing system, the sub unit uses a wireless receiver to receive absolutely accurate absolute time information and corrects the current time obtained from the clock based on the absolute time information.

Therefore, the data processing system is able to correct the time obtained by the clock of the sub unit to the absolute time obtained by the wireless receiver, and thus the clock can indicate an absolutely accurate time at nearly all times and thereby, the usage time limit of the program downloaded to the sub unit can be managed reliably.

At the time that a program is downloaded from the main unit to the sub unit, it is possible to set the time period over which the sub program is usable. For this reason, only a user who possesses the main program can extend the usage time limit of the downloaded program by regularly updating the usage time limit of the downloaded program. It is possible to prevent the illegal use of a downloaded program whose usage time limit has been exceeded by a user who does not possess the program recorded on the recording medium.

Moreover, in the data processing system, since the usage time limit of the program downloaded to the sub unit can be managed reliably, it is possible to set a trial-use period for the use of the downloaded program.

In the data processing method, a sub unit is removably connected to a main unit that performs data processing, and a program supplied from the main unit to the sub unit and the time of communication with the main unit are stored; a usage time limit, which is a time limit until the program is executable in the sub unit and which is obtained based on the time of communication, is compared against the current time; and control of the execution of the program is based on the results of this comparison.

Thereby, in the data processing method it is possible to download to the sub unit a program supplied by the main unit, compare the current time against the usage time limit obtained based on the time when the download occurred, and exert control of the execution of the program downloaded to the sub unit depending on these results.

In addition, in the data processing method the program supplied from the main unit to the sub unit is one that was read from a recording medium removably loaded in the main unit, the program stored in the sub unit is compared against that read from the recording medium, and the usage time limit of the program stored in the sub unit is updated depending on the results of this comparison.

Thereby, in the data processing method it is possible to compare the program read from the recording medium by the main unit against the program stored in the sub unit and update the usage time limit of the program stored in the sub unit depending on whether or not the program stored in the sub unit is that read from the recording medium loaded in the main unit.

In the data processing method, at the time that a program is downloaded from the main unit to the sub unit, it is possible to set the time period over which the sub program is usable. For this reason, only a user who possesses the main program can extend the usage time limit of the downloaded program by regularly updating the usage time limit of the downloaded program. On the other hand, the data processing method is able to prevent the illegal use of a downloaded program whose usage time limit has been exceeded by a user who does not possess the program recorded on the recording medium.

In the data processing apparatus, a program supplied by data processing equipment and the time of communication with the data processing equipment are stored, and the usage time limit, which is a time limit until the program is operated in the sub unit and which is obtained based on the time of communication, is compared by a time comparator against a time obtained from the clock and thus it is possible to exert control of the execution of the program based on these results of comparison.

Thereby, the data processing apparatus is able to download a program supplied by the data processing equipment, compare the current time obtained from the clock against the usage time limit obtained based on the time when the download occurred, and exert control of the execution of the downloaded program depending on these results.

In addition, in the data processing apparatus according to the present invention, the program is one read from a recording medium removably loaded into the data processing equipment, and a time updater updates the usage time limit of the program depending on the results of comparing the program against that read from the recording medium by the data processing equipment.

Thereby, the data processing apparatus according to the present invention is able to compare the program which is read by the data processing equipment from the recording medium against the stored program and update the usage time limit of the stored program depending on whether or not the stored program is that which is read from the recording medium loaded in the data processing equipment.

Moreover, the data processing apparatus uses a wireless receiver to receive absolutely accurate absolute time information, and corrects the current time obtained from the clock based on the absolute time information.

Therefore, the data processing apparatus according to the present invention is able to correct the time obtained by the clock based on the absolute time information received by the wireless receiver, and thus the clock can indicate an absolutely accurate time at nearly all times and therefore, the usage time limit of the downloaded program can be managed reliably.

In the data processing apparatus, at the time as a program is downloaded from the main unit to the sub unit, it is possible to set the time period over which the sub program is usable. For this reason, only a user who possesses the main program can extend the usage time limit of the downloaded program by regularly updating the usage time limit of the downloaded program. Moreover, it is possible to prevent the illegal use of a downloaded program whose usage time limit has been exceeded by a user who does not possess the program recorded on the recording medium.

Furthermore, in the data processing apparatus, since the usage time limit of the program downloaded to the sub unit can be managed reliably, it is possible to set a trial-use period for the use of the downloaded program.

In the data processing method, a program supplied from data processing equipment and the time of communication with the data processing equipment are stored, a usage time limit, which is a time limit until when said program is executable and which is obtained based on said time of communication, is compared against the current time, and control of the execution of said program is exerted based on the results of this comparison.

Thereby, the data processing method according to the present invention is able to download a program supplied by the data processing equipment, compare the current time against the usage time limit obtained based on the time when the download occurred, and exert control of the execution of the downloaded program depending on these results.

In addition, in the data processing method according to the present invention, the program is one that was read from a recording medium removably loaded in the data processing equipment, the program is compared against that read from the recording medium, and the usage time limit of the program is updated depending on the results of this comparison.

Thus, the data processing method is able to compare the program read from the recording medium. by the data processing equipment against the stored program and update the usage time limit of the stored program depending on whether or not the stored program is that read from the recording medium loaded in the data processing equipment.

In the data processing method, at the time that a program is downloaded from the main unit to the sub unit, it is possible to set the time period over which the sub program is usable. For this reason, only a user who possesses the main program can extend the usage time limit of the downloaded program by regularly updating the usage time limit of the downloaded program. Moreover, the data processing method according to the present invention is able to prevent the illegal use of a downloaded program whose usage time limit has been exceeded by a user who does not possess the program recorded on the recording medium.

What is claimed is:

1. A data processing system wherein a sub unit is removably connected via a connector to a main unit that performs data processing, a data processing system comprising:

a main unit having a program supply for supplying a program to said sub unit, said program being distributed as shareware;

said sub unit having a storage device for storing said program supplied by said program supply and the time of communication with said main unit;

a clock for marking time;

a time comparator for comparing a usage time limit, which is a time limit until when said program is executable in said sub unit and which is obtained based on said time of communication, against a time obtained from said clock; and an execution control means that controls execution of said program based on the results of comparison performed by said time comparator, wherein said sub unit has a wireless receiver that receives wireless signals from outside, and said wireless receiver receives absolutely accurate absolute time information, and said current time obtained from said clock can be corrected based on said absolute time information.

2. The data processing system according to claim 1, wherein the program supplied from said main unit to said sub unit is one that was read by said main unit by means of a program reader from a recording medium removably loaded into said main unit;

said main unit having a program comparator that compares said program stored in said storage device of said sub unit against that which is read from said recording medium by said program reader;

said sub unit having a time updater for updating said usage time limit, and said time updater updates said usage time limit of said program stored in said storage device depending on the results of comparison of said program comparison means.

3. The data processing system according to claim 1, wherein when said execution control means determines by said time comparator that the current time obtained from said clock has exceeded said usage time limit, the execution of said program is prohibited.

4. The data processing system according to claim 2, wherein, when said time updating means determines by said program comparator that said program was read from said recording medium, said usage time limit of said program is updated.

5. The data processing system according to claim 1, wherein, said usage time limit is a time found by adding a determined time to the time when said program was supplied from said main unit to said sub unit.

6. The data processing system according to claim 2, wherein, said time updater updates said usage time limit by adding said determined time to said current time obtained from said clock.

7. The data processing system according to claim 1, wherein, by regularly receiving absolutely accurate absolute time information by said wireless receiver, said sub unit is forced to correct said current time obtained from said clock based on said absolute time information.

8. The data processing system according to claim 1, wherein, said main unit is a video game machine and said sub unit is a portable information terminal machine.

9. In a data processing method wherein a sub unit is removably connected to a main unit that performs data processing, a data processing method which comprises:

storing a program supplied from said main unit to said sub unit and the time of communication with the main unit said program being distributed as shareware;

comprising a usage time limit, which is a time limit until when said program is executable in said sub unit and which is obtained based on said time of communication, against the current time; and controlling the execution of said program is based on the results of this comparison, making said sub unit receive absolutely accurate absolute time information, so that said current time obtained from said clock can be corrected based on said absolute time information.

10. The data processing method according to claim 9, wherein said program supplied from said main unit to said sub unit is one that said main unit had read from a recording medium removably loaded in said main unit, said program stored in the sub unit is compared against that read from said recording medium, and said usage time limit of said program stored in said sub unit is updated depending on the results of this comparison.

11. The data processing method according to claim 9, wherein when it is determined that said current time has exceeded said usage time limit, the execution of said program is prohibited.

12. The data processing method according to claim 10, wherein when it is determined that said program was read from said recording medium, said usage time limit of said program is updated.

13. The data processing method according to claim 10, wherein said usage time limit is updated by adding a determined time to said current time.

14. A data processing apparatus comprising:

storage for a program supplied by data processing equipment and the time of communication with said data processing equipment, said program being distributed as shareware;

a clock for marking time;

a time comparator for comparing a usage time limit, which is a time limit until the program is executable in the sub unit and which is obtained based on the time of communication, against a time obtained from the clock; and an execution control that exerts control of said program based on the results of comparison performed by said time comparator, and a wireless receiver that receives wireless signals from outside, wherein said wireless receiver receives absolutely accurate absolute time information, so that said current time obtained from said clock can be corrected based on said absolute time information.

15. The data processing apparatus according to claim 14, wherein said program is one read by said data processing equipment from a recording medium removably loaded into said data processing equipment;

has a time updater for updating said usage time limit, and said time updater updates said usage time limit of said program depending on the results of said data processing equipment comparing said program against that read from said recording medium.

16. The data processing apparatus according to claim 14, wherein when said execution control means determines by said time comparator that the current time obtained from said clock has exceeded said usage time limit, the execution of said program is prohibited.

17. The data processing apparatus according to claim 15, wherein when said time updater determines by said data processing equipment that said program was read from said recording medium, said usage time limit of said program is updated.

18. The data processing apparatus according to claim 14, wherein said usage time limit is a time found by adding a determined time to the time when said program was supplied from said data processing equipment.

19. The data processing apparatus according to claim 15, wherein said usage time limit is updated by adding said determined time to said current time obtained from said data processing equipment.

20. The data processing apparatus according to claim 14, wherein by regularly receiving absolutely accurate absolute time information by said wireless receiver, said current time obtained from said clock means is forcibly corrected based on said absolute time information.

21. A data processing method comprising:

storing a program supplied from data processing equipment and the time of communication with said data processing equipment, said program being distributed as shareware;

comprising a usage time limit, which is a time limit until when said program is executable and which is obtained based on said time of communication, against the current time;

controlling of the execution of said program based on the results of this comparison; and making said sub unit receive absolutely accurate absolute time information, so that said current time obtained from said clock can be corrected based on said absolute time information.

22. The data processing method according to claim 21, wherein said program is one that said data processing equipment had read from a recording medium removably loaded in said data processing equipment, said program is compared against that read from said recording medium, and said usage time limit of said program is updated depending on the results of this comparison.

23. The data processing method according to claim 21, wherein when it is determined that said current time has exceeded said usage time limit, the execution of said program is prohibited.

24. The data processing method according to claim 22, wherein when it is determined that said program was read from said recording medium, said usage time limit of said program is updated.

25. The data processing method according to claim 22, wherein said usage time limit is updated by adding a determined time to said current time.

* * * * *